United States Patent
Nicholson et al.

(10) Patent No.: US 9,641,629 B2
(45) Date of Patent: May 2, 2017

(54) DISTANCE-BASED NETWORK RESOURCE DISCOVERY

(75) Inventors: John Weldon Nicholson, Holly Springs, NC (US); Daryl Cromer, Cary, NC (US); John Miles Hunt, Raleigh, NC (US); Howard Locker, Cary, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 174 days.

(21) Appl. No.: 13/305,525

(22) Filed: Nov. 28, 2011

(65) Prior Publication Data

US 2013/0138796 A1 May 30, 2013

(51) Int. Cl.
| | | |
|---|---|---|
| *G06F 15/173* | (2006.01) | |
| *H04L 29/08* | (2006.01) | |
| *H04L 12/28* | (2006.01) | |
| *H04W 4/02* | (2009.01) | |

(52) U.S. Cl.
CPC .......... *H04L 67/18* (2013.01); *H04L 12/2809* (2013.01); *H04L 67/16* (2013.01); *H04W 4/023* (2013.01); *H04L 2012/2849* (2013.01)

(58) Field of Classification Search
CPC ..... H04L 12/66; H04L 12/5692; H04L 67/16; H04L 67/18; H04W 48/18; H04W 4/02; H04W 16/30; H04W 4/023; G01S 5/0252
USPC .......... 709/221–226; 455/411, 422.1, 456.3, 455/525, 456.1, 62; 340/539.13, 8.1, 340/286.02; 370/252, 338, 254
See application file for complete search history.

(56) References Cited

U.S. PATENT DOCUMENTS

| | | | | |
|---|---|---|---|---|
| 6,760,599 | B1 * | 7/2004 | Uhlik ............................. | 455/525 |
| 7,024,479 | B2 * | 4/2006 | Shah et al. .................... | 709/227 |
| 7,047,311 | B2 * | 5/2006 | Oishi et al. ................... | 709/233 |
| 7,127,510 | B2 * | 10/2006 | Yoda et al. .................... | 709/225 |
| 7,219,189 | B1 * | 5/2007 | Ryu et al. ..................... | 711/111 |
| 7,643,835 | B1 * | 1/2010 | Nosack et al. ............. | 455/456.3 |
| 8,717,931 | B2 * | 5/2014 | Taniuchi ............. | H04L 12/5692 370/254 |
| 2005/0266855 | A1 * | 12/2005 | Zeng ..................... | G01S 5/0252 455/456.1 |
| 2006/0046709 | A1 * | 3/2006 | Krumm et al. ............. | 455/422.1 |
| 2006/0187858 | A1 * | 8/2006 | Kenichi et al. ............... | 370/254 |
| 2006/0219830 | A1 * | 10/2006 | Nilsson-Wulff et al. ..... | 241/207 |
| 2008/0095072 | A1 * | 4/2008 | Shao et al. .................... | 370/254 |
| 2008/0180227 | A1 * | 7/2008 | Le ........................... | H04L 12/66 340/286.02 |
| 2009/0102642 | A1 * | 4/2009 | Huseth et al. ........... | 340/539.13 |
| 2009/0103503 | A1 * | 4/2009 | Chhabra ...................... | 370/338 |
| 2009/0111485 | A1 * | 4/2009 | Kitani ................... | H04W 48/18 455/456.1 |
| 2010/0246419 | A1 * | 9/2010 | Batta et al. ................... | 370/252 |

(Continued)

*Primary Examiner* — Dustin Nguyen
(74) *Attorney, Agent, or Firm* — Kunzler Law Group

(57) ABSTRACT

An apparatus for distance-based network resource discovery includes a storage device storing machine-readable code and a processor executing the machine-readable code. The machine-readable code includes a determination module determining a distance between an information handling device and a network resource capable of communication with the information handling device. The machine readable code also includes a policy module following a discovery policy according to the distance. The discovery policy is associated with discovery of the network resource.

15 Claims, 6 Drawing Sheets

(56) References Cited

U.S. PATENT DOCUMENTS

| | | | |
|---|---|---|---|
| 2012/0230193 A1* | 9/2012 | Fang | 370/235 |
| 2012/0249300 A1* | 10/2012 | Avital et al. | 340/8.1 |
| 2012/0297055 A9* | 11/2012 | Raleigh | 709/224 |
| 2013/0029606 A1* | 1/2013 | Wang | H04W 16/30 455/62 |
| 2013/0052990 A1* | 2/2013 | Zhang | 455/411 |
| 2013/0295962 A1* | 11/2013 | Manroa | H04W 4/02 455/456.3 |

* cited by examiner

DISTANCE-BASED NETWORK RESOURCE DISCOVERY

BACKGROUND

Field

The subject matter disclosed herein relates to network resources and more particularly relates to discovering network resources based on distance.

Description of the Related Art

Many information handling devices have the capability to discover and communicate with network resources. For example, a Bluetooth™ enabled smartphone may detect, pair with, and communicate with wireless network resources such as Bluetooth™ enabled headsets, keyboards and mice, extending the capabilities of the smartphone. A device capable of communicating on a local area network ("LAN") or a wireless local area network ("WLAN") may also discover, connect to, and communicate with other network resources through cable connections, peer-to-peer connections or access points.

With the increasing number of network resources, available network resources—those in wireless communication range or in communication with a cable connection—located during discovery may overwhelm a user deciding which resources to communicate with. Furthermore, the user may have difficulty determining which network resources pertain to those that belong to the user and/or are available for use.

BRIEF SUMMARY

Based on the foregoing discussion, the inventors have recognized a need for an apparatus, system, and method that manages network resource discovery based on distance. Beneficially, such an apparatus, system, and method would follow a discovery policy based on a distance between an information handling device and a network resource.

The embodiments of the present subject matter have been developed in response to the present state of the art, and in particular, in response to the problems and needs in the art that have not yet been fully solved by currently available information handling devices. Accordingly, the embodiments have been developed to provide a method, apparatus, and system for distance-based network resource discovery that overcome many or all of the above-discussed shortcomings in the art.

An apparatus is provided with a storage device storing machine-readable code, a processor executing the machine-readable code, and a plurality of modules configured to functionally execute the steps for distance-based wireless network resource discovery. These modules in at least a portion of the described embodiments include a determination module and a policy module.

In one embodiment, the determination module determines a distance between an information handling device and a network resource capable of communication with the information handling device. In one embodiment, the policy module follows a discovery policy according to the distance. In one embodiment, the discovery policy is associated with discovery of the network resource.

A method is also presented; in the disclosed embodiments, the method substantially includes the steps to carry out the functions presented above with respect to the operation of the described apparatus. In one embodiment, the method includes determining a distance between an information handling device and a network resource capable of communication with the information handling device. In one embodiment, the method includes following a discovery policy according to the distance. In one embodiment, the discovery policy is associated with discovery of the network resource.

A computer program product including a storage device storing machine readable code executed by a processor to perform operations is also presented. In one embodiment, the operations include determining a distance between an information handling device and a network resource capable of communication with the information handling device. In one embodiment, the operations include following a discovery policy according to the distance and the discovery policy is associated with discovery of the network resource.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
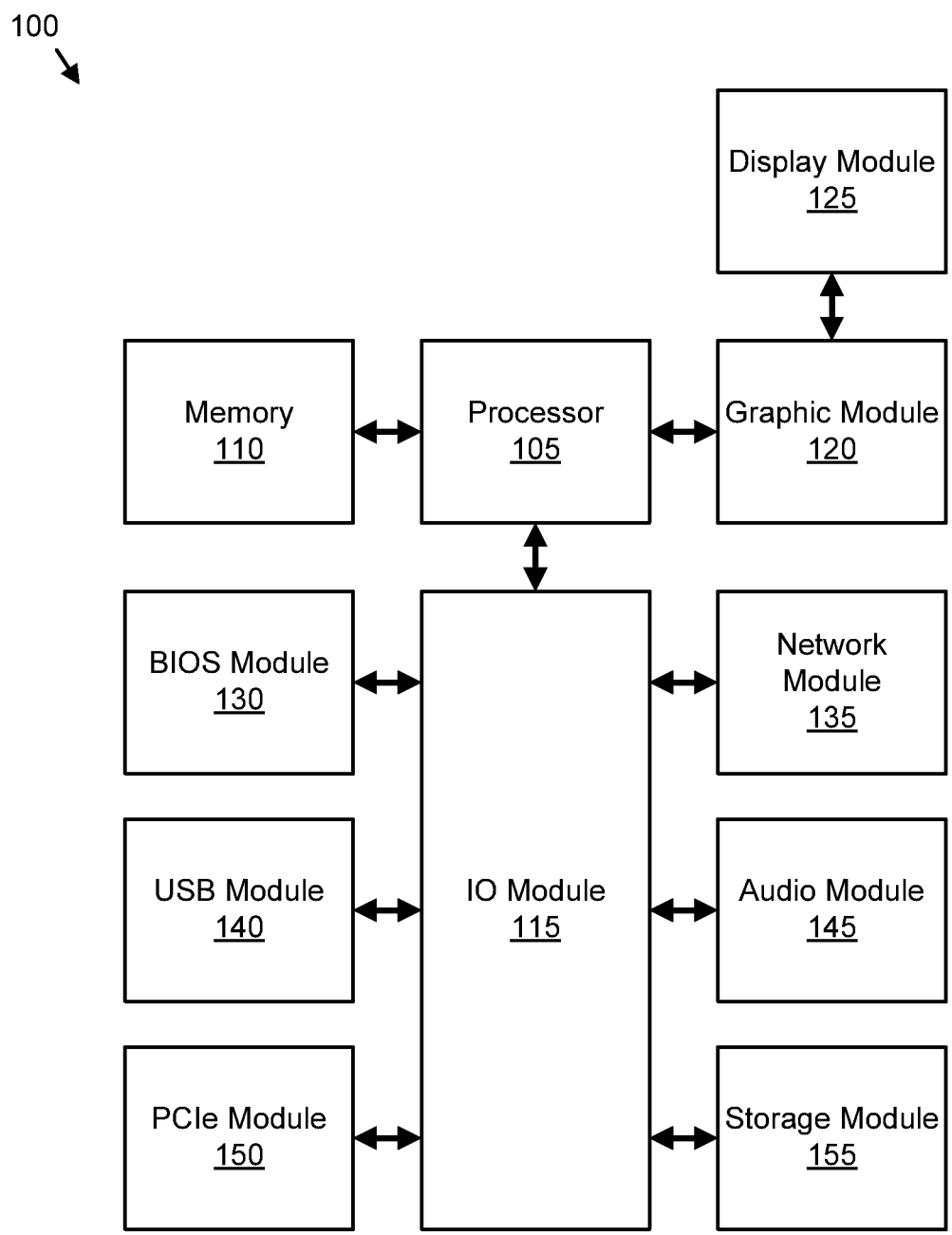
FIG. 1 is a schematic block diagram illustrating one embodiment of a computer system in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this file, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof, A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of a computer system 100. The computer system 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computer system 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computer system 100, so that computer readable software instructions stored on the storage module 155 can load, execute, and assume control of the computer system 100. Alternatively, the BIOS module 130 may comprise a coded program embedded on a chipset that recognizes and controls various devices that make up the computer system 100.

The network module 135 may communicate with the IO module 115 to allow the computer system 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
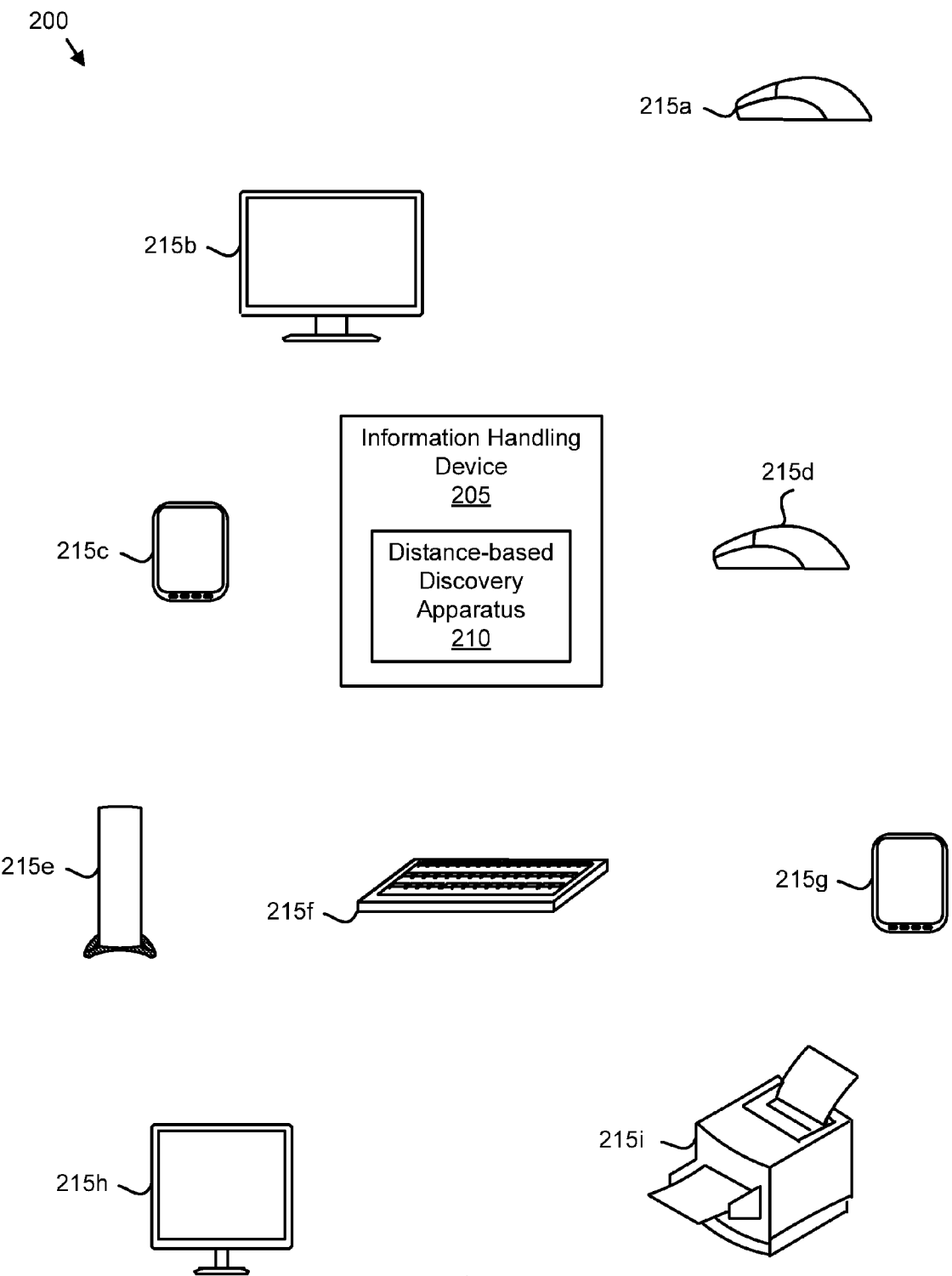
FIG. 2 is a schematic block diagram illustrating one embodiment of a system for distance-based network resource discovery in accordance with the present subject matter.

FIG. 2 illustrates one embodiment of a system 200 for distance-based network resource discovery. The system 200 includes an information handling device 205 with a distance-based discovery apparatus 210 and a plurality of network resources at various distances from the information handling device 205.

The information handling device 205 may include memory, a storage device storing computer readable programs, and/or a processor that executes the computer readable programs as is known to those skilled in the art. The information handling device 205, in certain embodiments, may comprise the computer system 100 depicted in FIG. 1 or at least a portion of the components of the computer system 100 and may be embodied as a portable or handheld electronic device and/or portable or handheld computing device such as a personal desktop assistant ("PDA"), a tablet computer, a slate or pad computer, an e-Book reader, a mobile phone, a smartphone, and the like. In other embodiments, the information handling device 205 may be embodied as a desktop computer, a portable computer, a server, a mainframe computer, and/or the like.

The information handling device 205, in one embodiment, is a wireless information handling device 205—an information handling device 205 capable of communicating over one or more wireless networks. The information handling device 205 may be a Wireless Local Area Network ("WLAN") enabled device communicating over one or more wireless channels and/or frequencies according to the Wi-Fi® standard from the Wi-Fi Alliance®, and/or Institute of Electrical and Electronics Engineers ("IEEE") 802.11 standards as is known in the art. In certain embodiments, the information handling device 205 is capable of communicating wirelessly and/or capable of discovering wireless network resources 215a-i, or network resources that communicate wirelessly.

In one embodiment, the information handling device 205 communicates through a cable connection, a Local Area Network ("LAN"), and/or the like. The information handling device 205 may discover network resources 215a-i that are in wired communication with the information handling device 205.

The information handling device 205 may discover network resources 215a-i using a protocol that provides a personal area network ("PAN") (e.g. Bluetooth™ protocol), DNS Service Discovery ("DNS-SD") protocol, a Universal Plug and Play ("UPnP") protocol, a Neighbor Discovery Protocol ("NDP"), and/or the like. Of course, the information handling device 205 may communicate using any suitable communication protocol.

The information handling device 205 may be capable of communicating in an infrastructure mode that involves communicating with one or more wireless networks by way of an access point. The information handling device 205 may also be capable of communicating in a peer-to-peer mode directly with other devices and/or network resources 215a-i.

The plurality of network resources 215a-i may include wireless devices (e.g. devices capable of wireless communication), services, devices that offer services, devices and/or services in communication over a wired connection, and/or the like. Examples of network resources 215a-i include, but are not limited to, wireless networks, printing services, storage services, wireless monitors, wireless keyboards, wireless mice, portable information handling devices, and/or the like. For example, in one embodiment, the information handling device 205 is a Bluetooth™ enabled Smartphone and the network resources 215a-i include a Bluetooth™ enabled headset, keyboard, and mouse. In one embodiment, the information handling device 205 is a personal computer ("PC") connected to a LAN and the network resources 215a-i include a printer offering printing services, a storage device, and the like.

The information handling device 205 may discover network resources 215a-i capable of communicating with the information handling device 205. In one embodiment, the information handling device 205 may discover network resources 215a-i in communication range with the information handling device 205. As used herein, to discover a network resource 215 means to detect the availability of, presence of, and/or identity of network resources 215a-i. The information handling device 205 may discover, establish an initial communication with (e.g. pair, locate a printer or a disk drive, and the like), and/or engage in ongoing communication with network resources 215a-i over one or more networks. Examples of networks include, but are not limited to a Wireless Local Area Network ("WLAN"), a Local Area Network ("LAN"), a PAN—such as those established by Bluetooth™—or other suitable communications network.

With the increasing number of network resources 215a-i available, resource discovery of the information handling device 205 may yield a great number of network resources 215a-i. A user may have difficulty determining which network resources 215a-i to communicate with. For example, if a user has a Bluetooth™ enabled device with several Bluetooth™ compatible network resources 215a-i in the user's office but other users in nearby offices also have several Bluetooth™ compatible network resources 215a-i, the user's information handling device 205 may discover all of these network resources 215a-i and the user may be confused as to which network resources 215a-i to communicate with. In addition, if a user has a PC connected to a LAN with multiple available printers in various locations in the user's building, the user may browse for a printer and may be confused as to which printer is the closest upon being presented with printers for the entire LAN scattered throughout the building.

Therefore, the information handling device 205 includes a distance-based discovery apparatus 210 to follow and/or implement a discovery policy according to a physical distance between network resources 215a-i in communication range with the information handling device 205. The distance-based discovery apparatus 210 may, according to the discovery policy, prioritize network resources 215a-i according to the physical distance and/or limit discovery of network resources 215a-i according to the physical distance.

For example, in one embodiment, the distance-based discovery apparatus 210 assigns higher priority to network resources 215c,d that are closer to the information handling device 205. The distance-based discovery apparatus 210 may sort or present the network resources 215*a-i* in order of priority such that closer network resources 215*a-i* appear near the top of a list of available resources. Consequently, a user may recognize which network resources 215*a-i* have a higher likelihood of being available or convenient for use (e.g. those located in the user's office instead of located in an office down the hall, those belonging to the user, and the like).

Figure 3:
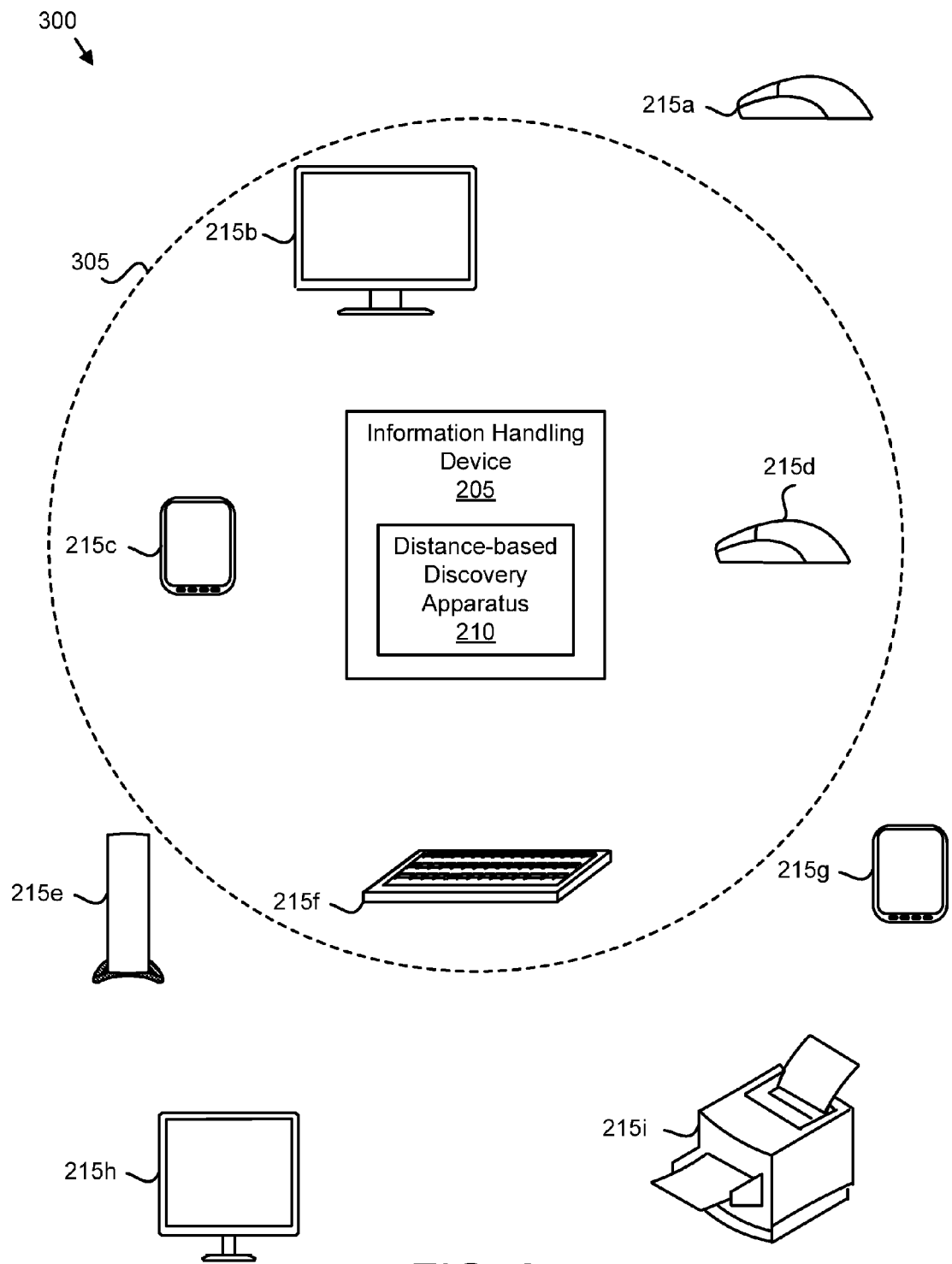
FIG. 3 is a schematic block diagram illustrating another embodiment of a system for distance-based network resource discovery in accordance with the present subject matter.

Referring to FIG. 3, in certain embodiments, the distance-based discovery apparatus 210 limits discovery of network resources 215*a-i* according to the physical distance. Specifically, the distance-based discovery apparatus 210 may designate, as discoverable, network resources 215*b,c,d,f* that are located within a certain physical distance 305 from the information handling device 205. Consequently, the distance-based discovery apparatus 210 may not present network resources 215*a,e,g,h,i* that are physically farther away and the user may only see those which have a higher likelihood of being available or convenient for use.

The distance-based discovery apparatus 210 may reside in or be in communication with the information handling device 205. In one embodiment, the distance-based discovery apparatus 210 communicates with and/or is integrated with software, drivers, hardware, and/or firmware responsible for wireless (e.g. WLAN or Bluetooth™) or wired communication for the information handling device 205. In certain embodiments, the distance-based discovery apparatus 210 comprises application software that receives a list of discovered network resources 215*a-i* from driver-level software and modifies (e.g. prioritizes or removes list entries) the list. All or a portion of the distance-based discovery apparatus 210 may be stored on memory and executed by a processor (e.g. of the information handling device 205).

Figure 4:
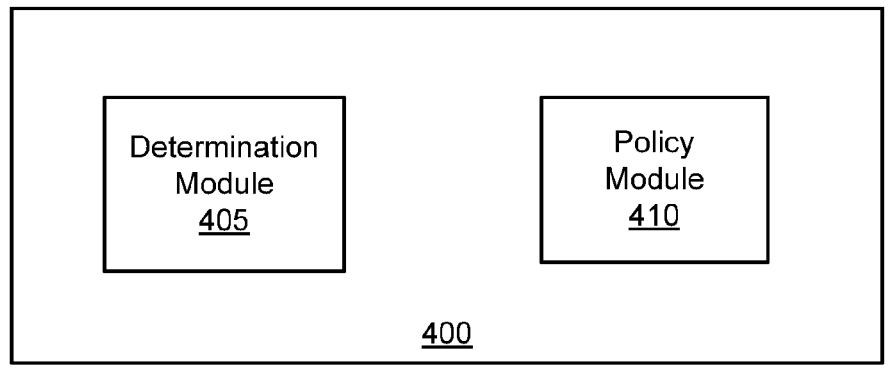
FIG. 4 is a schematic block diagram illustrating one embodiment of an apparatus for distance-based network resource discovery in accordance with the present subject matter.

FIG. 4 illustrates one embodiment of an apparatus 400 for distance-based network resource discovery. The apparatus 400 may comprise one embodiment of the distance-based discovery apparatus 210 depicted in FIG. 3. The apparatus 400 includes one or more of a determination module 405 and a policy module 410.

The determination module 405, in one embodiment, determines a distance between an information handling device 205 and a network resource 215 capable of communication with the information handling device 205. As used herein, a network resource 215 is capable of communication with the information handling device 205 when the network resource 215 is a wireless network resource (e.g. a network resource capable of wireless communication) and in communication range with the information handling device 205, when the network resource 215 is connected to the information handling device 205 by a wired connection, a LAN, and/or the like.

In one embodiment, the network resource 215 is a wireless network resource and the determination module 405 determines the distance between the information handling device 205 and the network resource 215 using a signal strength of a signal from the network resource 215 and a transmission power level of the network resource 215 as described below. In one embodiment, the determination module 405 determines the distance between the information handling device 205 and the network resource 215 using a location of the network resource 215 and a location of the information handling device 205.

In one embodiment, the determination module 405 references, retrieves, and/or determines the location (e.g. the physical location) of the information handling device 205. The location of the information handling device 205 may be input (e.g. in GPS coordinates or other suitable form) by the user and stored by the determination module 405. The location of the information handling device 205 may be determined based on Global Positioning System ("GPS") data for the information handling device 205 as described below. For example, the information handling device 205 may include and/or communicate with a GPS device providing GPS data to obtain a location.

In one embodiment, the determination module 405 references, retrieves, and/or determines the location (e.g. the physical location) of the network resource 215. As described below, the location of the network resource 215 may be transmitted by the network resource 215 and received and/or referenced by the determination module 405. For example, in one embodiment, a wireless protocol may be modified to enable a network resource 215 to transmit location data, such as GPS coordinates or other suitable location coordinates. For example, the Bluetooth™ protocol may be modified to transmit location coordinates as part of a query reply during an initial pairing. The determination module 405 may use the transmitted location coordinate as the location of the network resource 215.

The determination module 405, in certain embodiments, determines the distance by comparing the location of the network resource 215 with the location of the information handling device 205. In one embodiment, the locations of the network resource 215 and the information handling device 205 are expressed in GPS coordinates, Universal Transverse Mercator ("UTM") coordinates, or other suitable location coordinates and the determination module 405 determine the distance using the coordinates of the network resource 215 and the coordinates of the information handling device 205 with the Pythagorean Theorem or the Great Circle Calculation as will be apparent to one of ordinary skill in the art in light of this disclosure.

In one embodiment, the determination module 405 determines distances between the information handling device 205 and each network resource 215 capable of communication with the information handling device 205. In one embodiment, the determination module 405 determines distances for network resources 215*a-i* in which a wireless signal strength is above a predetermined threshold, for a predetermined number of network resources 215*a-i*, and/or the like.

The policy module 410, in one embodiment, follows a discovery policy according to the distance. The discovery policy is associated with discovery of network resources 215*a-i*. The discovery policy may specify an action for the policy module 410 to take in response to distances determined by the determination module 405 for each network resource 215 capable of communication with the information handling device 205.

In one embodiment, the policy module 410 prioritizes network resources 215*a-i* capable of communication with the information handling device 205 (e.g. discovered or discoverable network resources 215*a-i*). In one embodiment, the policy module 410 prioritizes a network resource 215 with one or more additional network resources 215*a-i* according to the distance. The policy module 410 may give closer network resources 215*a-i* (e.g. those in which the determined distance is less) a higher priority in relation to network resources 215*a-i* further away.

In one embodiment, the determination module 405 determines a first distance between the information handling device 205 and first network resource 215*b* and determines a second distance between the information handling device 205 and a second network resource 215*h*, the second distance being greater than the first distance. The policy module 410 may assign the first network resource 215b a higher priority than the second network resource 215h.

In one embodiment, the policy module 410 sorts a list of network resources 215a-i and/or indicators of network resources 215a-i in order of priority (e.g. higher priority network resources 215a-i are sorted near the top of the list). Therefore, a user, when viewing available network resources 215a-i for discovery, sees the closest network resources 215a-i near the top of the list of network resources 215a-i. In one embodiment, the policy module 410 indicates one or more network resources 215a-i that are of a higher priority in relation to one or more additional network resources 215a-i (e.g. the policy module 410 may highlight or bold a particular network resource 215).

In one embodiment, the policy module 410 indicates that a network resource 215 is available for communication in response to determining that the distance is within a predetermined threshold. In this embodiment, the policy module 410 may disregard network resources 215a,e,g,h,i outside the predetermined threshold and/or designate such network resources 215a,e,g,h,i as unavailable for communication. The policy module 410 may show only those network resources 215b,c,d,f as discovered and/or discoverable that are within the predetermined threshold.

The policy module 410, in one embodiment prioritizes and/or discovers network resources 215a-i based on distance as part of driver-level network resource discovery (e.g. the policy module 410 may be integrated with software, drivers, hardware, and/or firmware responsible for network and/or wireless communication for the information handling device 205 with other devices/services). In certain embodiments, the distance-based discovery apparatus 210 comprises application software that receives a list and/or identification of discovered network resources 215a-i from driver-level software and modifies (e.g. prioritizes and/or removes network resources 215a-i) from the list.

In one embodiment, the policy module 410 stores distance profiles for certain network resources 215a-i. If the policy module 410 recognizes a particular network resource 215b (e.g. it has been discovered before and/or a distance has already been determined, as recognized by a network resource name or identifier), the policy module 410 may refer to the distance profile, which may include a predetermined distance and/or a predetermined priority to assign to the particular network resource 215b.

Figure 5:
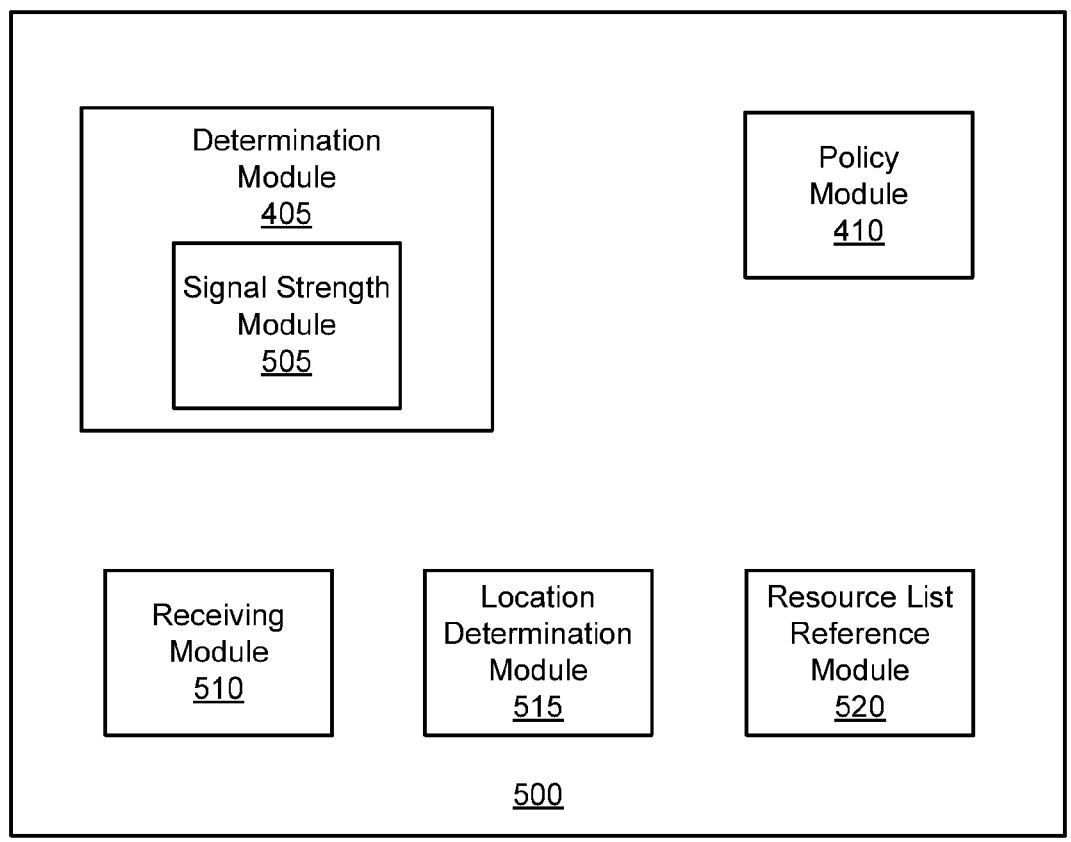
FIG. 5 is a detailed schematic block diagram illustrating another embodiment of an apparatus for distance-based network resource discovery in accordance with the present subject matter.

FIG. 5 illustrates one embodiment of an apparatus 500 for distance-based network resource discovery. The apparatus 500 may comprise one embodiment of the distance-based discovery apparatus 210 depicted in FIG. 3. The apparatus 500 includes the determination module 405 and the policy module 410. In addition, the determination module 405 includes a signal strength module 505 and the apparatus 500 includes one or more of a receiving module 510, a location determination module 515, and a resource list reference module 520.

The signal strength module 505, in one embodiment, determines the distance between the information handling device 205 and a network resource 215 capable of wireless communication based on a signal strength of the network resource 215 and a transmission power level of the network resource 215. In certain embodiments, signal strength alone is not sufficient to determine distance as a first network resource 215h may have a signal strength equal to a second network resource 215b closer than the first network resource 215h because the first network resource has a stronger transmission power level.

In one embodiment, the signal strength module 505 combines the signal strength of a wireless signal of the network resource 215 with the transmission power level at which the network resource 215 is transmitting. For example, in one embodiment, the signal strength module 505 quantifies signal strength and transmission power level and multiplies the signal strength by the power level for each network resource 215 to arrive at a distance value for each network resource 215. The signal strength module 505 may then determine distance based on the distance value, and/or signal to the policy module 410 to prioritize based on the distance values or disregard network resources 215a-i with distance values below a predetermined threshold. In one embodiment, the signal strength module 505 references the signal strength and/or power level using the received signal strength indicator ("RSSI"), a measurement of the power present in a received radio signal that is provided by most wireless communication hardware.

The receiving module 510, in one embodiment, receives location information from the network resource 215 specifying a location of the network resource 215. As stated above, in one embodiment, a wireless protocol may be modified to enable a network resource 215 to transmit location information, such as GPS coordinates or other suitable location coordinates. For example, as described above, the Bluetooth™ protocol may be modified to transmit location coordinates as part of a query reply during an initial pairing. In one embodiment, the network resource 215 includes a GPS device providing location coordinates for the network resource 215 (e.g. a device providing the service) that the network resource 215 transmits and that the receiving module 510 receives. In other embodiments, a user may designate location information for the network resource 215 that may be stored and/or transmitted by the network resource 215. The receiving module 510 may make the location information available to the determination module 405.

The location determination module 515, in one embodiment, determines a location of the information handling device 205 based on GPS data for the information handling device 205. The determination module 405 may determine the distance between the information handling device 205 and network resources 215a-i based on this GPS data as a location for the information handling device 205.

The resource list reference module 520, in one embodiment, receives a list of network resources 215a-i capable of communication with the information handling device 205. The list may include an identification of discovered/discoverable network resources 215a-i and may be determined according to a resource discovery protocol. The policy module 410 may modify the list (e.g. prioritize the network resources 215a-i or eliminate certain network resources 215a,e,g,h,i) according to the distance. For example, the resource list reference module 520 may include a software application that references and/or receives the list from driver-level software that discovers network resources 215a-i. The resource discovery protocol that provides the list may be a protocol that provides a personal area network ("PAN") such as Bluetooth™, a DNS Service Discovery ("DNS-SD") protocol, a Universal Plug and Play ("UPnP") protocol, or a Neighbor Discovery Protocol ("NDP").

Figure 6:
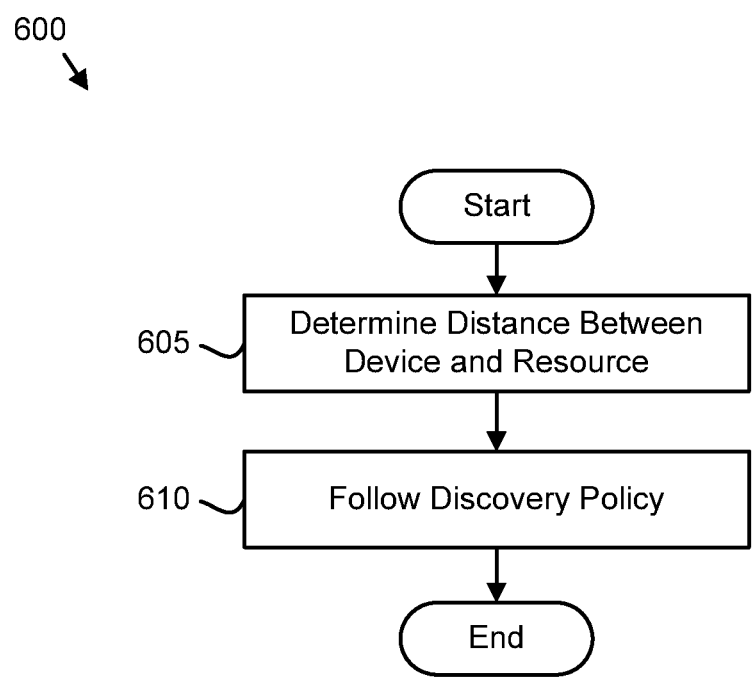
FIG. 6 is a schematic flow chart diagram illustrating one embodiment of a method for distance-based network resource discovery in accordance with the present subject matter.

FIG. 6 illustrates one embodiment of a method 600 for distance-based network resource discovery. The method 600 may implement at least a portion of the functions of the apparatus 400 of FIG. 4. The description of the method 600 refers to elements of FIGS. 1-4, like numbers referring to like elements. The method 600 begins and the determination module 405 determines a distance 605 between an information handling device 205 and a network resource 215 capable of communication with the information handling device 205. Next, the policy module 410 follows 610 a discovery policy according to the distance. The discovery policy is associated with discovery of the network resource 215. Then, the method 600 ends.

Figure 7:
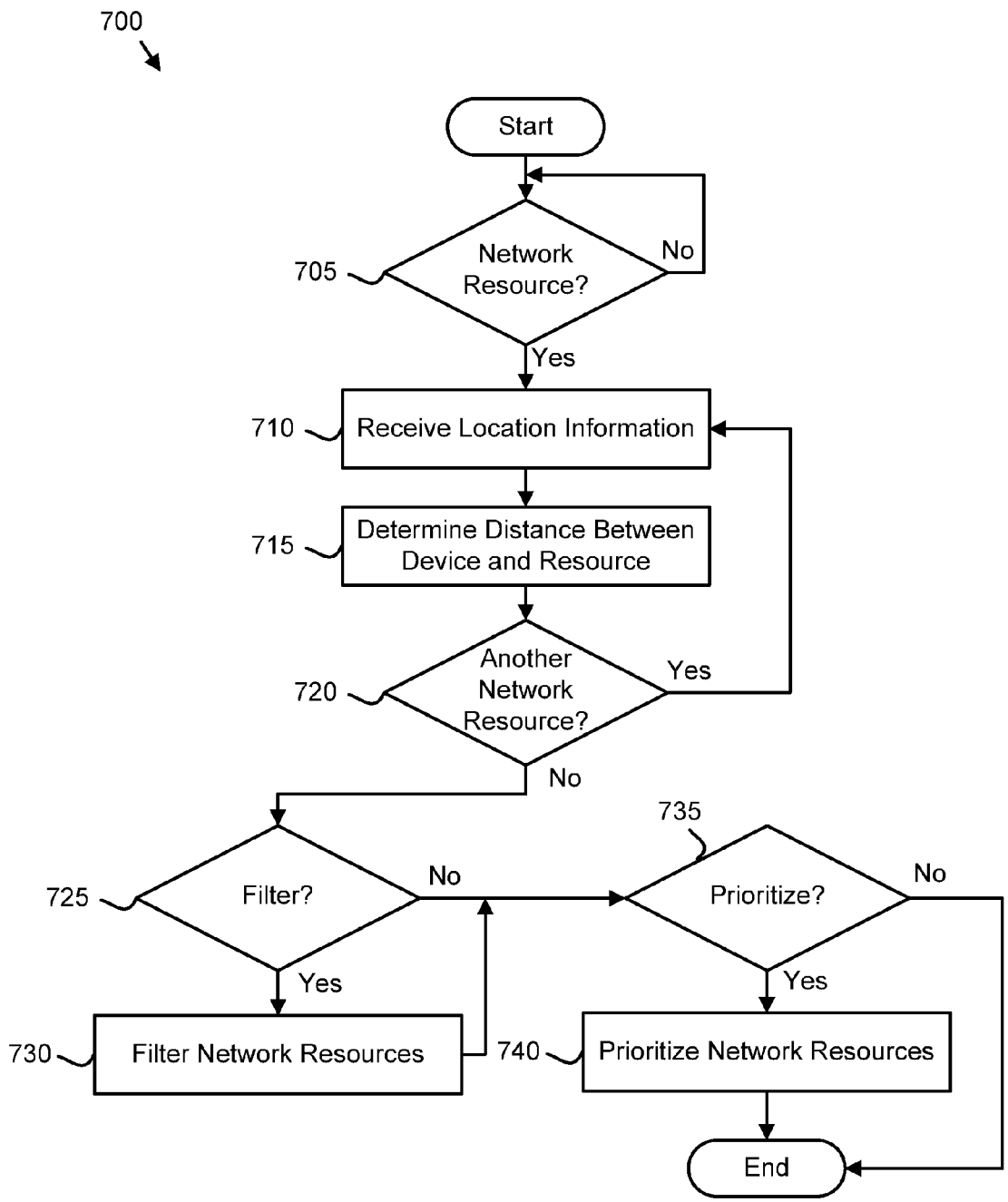
FIG. 7 is a detailed schematic flow chart diagram illustrating another embodiment of a method for distance-based network resource discovery in accordance with the present subject matter.

FIG. 7 illustrates another embodiment of a method 700 for distance-based network resource discovery. The method 700 may implement at least a portion of the functions of the apparatus 500 of FIG. 5. The description of the method 700 refers to elements of FIGS. 1-5, like numbers referring to like elements.

The method 700 begins and the determination module 405 determines 705 whether any network resources 215a-i are capable of communication with the information handling device 205. If the determination module 405 detects 705 one such network resource 215, the receiving module 510 receives 710 location information from the network resource 215 specifying a location of the network resource 215. The determination module 405 then determines 715 a distance between the network resource 215 and the information handling device 205. In one embodiment, the determination module 405 determines the distance based on a location of the information handling device 205 (e.g. GPS coordinates of the information handling device 205) and the location of the network resource 215). If the determination module 405 determines 720 that another network resource 215 is capable of communication with the information handling device 205, the method repeats steps 705 through 720. Furthermore the method repeats steps 705 through 720 for each network resource 215 capable of communication with the information handling device 205.

If the policy module 410 determines 725 that the discovery policy specifies that certain network resources 215a,e,g,h,i are to be filtered out (e.g. indicated as unavailable, undiscoverable, disregarded, and the like), the policy module 410 filters 730 out the network resources 215a,e,g,h,i that are beyond a predetermined distance from the information handling device 205.

Next or alternatively, if the policy module 410 determines 735 that the discovery policy specifies that the network resources 215a-i are to be prioritized, the policy module 410 prioritizes 740 the network resources 215a-i based on distance from the information handling device 205. For example, network resources 215a-i closer in distance may be assigned a higher priority than network resources 215a-i farther away in distance. The policy module 410 may prioritize each network resource 215 capable of communication with the information handling device 205 and/or may prioritize network resources 215b,c,d,f that remain after the policy module 410 filters out network resources 215a,e,g,h,i that have a distance from the information handling device 205 greater than the predetermined threshold. Then, the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing code;
a processor executing the code to:
determine a wireless signal strength of a network resource;
determine a transmission power level of the network resource;
determine a distance value for the network resource by multiplying the wireless signal strength by the transmission power level; and
in response to the distance value being below a predetermined threshold, filter out the network resource.

2. The apparatus of claim 1, wherein the code is further executable by the processor to prioritize the network resource with one or more other network resources according to distance values for each network resource.

3. The apparatus of claim 2, wherein prioritizing the network resource with the one or more other network resources according to the distance values comprises assigning a first network resource a higher priority relative to a second network resource when the distance value for the first network resource is greater than the distance value for the second network resource.

4. The apparatus of claim 1, wherein the code is further executable by the processor to receive location information from the network resource specifying a location of the network resource, wherein the processor determines the wireless signal strength for the network resource by comparing the location of the network resource with a location of the information handling device and the transmission power level.

5. The apparatus of claim 4, wherein the code is further executable by the processor to determine the location of the information handling device based on Global Positioning System ("GPS") data for the information handling device.

6. The apparatus of claim 1, wherein the network resource comprises a service provided by a network device.

7. The apparatus of claim 1, wherein the code is further executable by the processor to receive a list of network resources capable of communication with the information handling device, the list determined according to a resource discovery protocol, wherein the processor modifies the list according to the distance value.

8. The apparatus of claim 7, wherein the resource discovery protocol comprises one of a protocol providing a personal area network ("PAN"), a DNS Service Discovery ("DNS-SD") protocol, a Universal Plug and Play ("UPnP") protocol, and a Neighbor Discovery Protocol ("NDP").

9. The apparatus of claim 2, wherein prioritizing the network resource with the one or more other network resources according to the distance values for each network resource comprises assigning a first network resource a higher priority relative to a second network resource when the distance value for the first network resource is greater than the distance value for the second network resource.

10. A method comprising:
determining, by use of a processor, a wireless signal strength of a network resource;
determining a transmission power level of the network resource;
determining a distance value for the network resource by multiplying the wireless signal strength by the transmission power level; and
in response to the distance value being below a predetermined threshold, filtering out the network resource.

11. The method of claim 10, wherein the method further comprises prioritizing the network resource with one or more-other network resources according to the distance values for each network resource.

12. The method of claim 11, wherein prioritizing the network resource with the one or more other network resources according to the distance values for each network resource comprises assigning a first network resource a higher priority relative to a second network resource when the distance value for the first network resource is greater than the distance value for the second network resource.

13. The method of claim 10, the method further comprising receiving location information from the network resource specifying a location of the network resource, wherein determining the wireless signal strength for the network resource further comprises comparing the location of the network resource with a location of the information handling device and the transmission power level.

14. A computer program product comprising a storage device storing machine readable code executable by a processor to perform the operations of:
   determining a wireless signal strength of a network resource;
   determining a transmission power level of the network resource;
   determining a distance value for the network resource by multiplying the wireless signal strength by the transmission power level; and
   in response to the distance value being below a predetermined threshold, filtering out the network resource.

15. The computer program product of claim 14, the processor further prioritizing the network resource with one or more other network resources according to the distance values for each network resource.

* * * * *